US 8,402,460 B2

(12) United States Patent
Moore et al.

(10) Patent No.: US 8,402,460 B2
(45) Date of Patent: *Mar. 19, 2013

(54) INSTALLING AND UPDATING INTERPRETED PROGRAMMING LANGUAGE APPLICATIONS USING A DESIGNATED VIRTUAL MACHINE

(75) Inventors: Bryan R. Moore, Georgetown, TX (US); Nikhil Gupta, Cedar Park, TX (US); Jeffrey M. Achtermann, Austin, TX (US); Victor G. Yiu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,276

(22) Filed: Jan. 5, 2012

(65) Prior Publication Data

US 2012/0110569 A1 May 3, 2012

Related U.S. Application Data

(63) Continuation of application No. 11/333,451, filed on Jan. 17, 2006, now Pat. No. 8,127,288.

(51) Int. Cl.
*G06F 9/445* (2006.01)
(52) U.S. Cl. .............................. 717/178; 718/1; 717/175
(58) Field of Classification Search ........................ None
See application file for complete search history.

(56) References Cited

U.S. PATENT DOCUMENTS

| 4,970,639 | A | 11/1990 | Diefendorf et al. |
| 6,006,034 | A | 12/1999 | Heath et al. |
| 6,272,677 | B1 | 8/2001 | Lam et al. |
| 6,381,741 | B1 * | 4/2002 | Shaw .............................. 717/168 |
| 6,381,742 | B2 | 4/2002 | Forbes et al. |
| 7,222,341 | B2 * | 5/2007 | Forbes et al. .................. 717/170 |
| 7,281,047 | B2 | 10/2007 | Hayko et al. |
| 7,523,116 | B2 | 4/2009 | Yan |
| 2003/0093508 | A1 * | 5/2003 | Li et al. .......................... 709/222 |
| 2007/0169025 | A1 | 7/2007 | Moore et al. |
| 2007/0169110 | A1 | 7/2007 | Gupta et al. |

OTHER PUBLICATIONS

USPTO U.S. Appl. No. 11/260,576, 3 pages.
USPTO U.S. Appl. No. 11/333,451, 3 pages.
Kim, Steven, "Java Web Start", Sep. 1, 2001, IBM developerWorks, Retrieved from http://www.ibm.com/developerworks/java/library/j-webstart/ on Sep. 24, 2009, 15 pages.
Sun Microsystems, Inc., "Java Network Launching Protocol & API Specification (JSR-56)", May 21, 2001, Sun Microsystems Inc. , Retrieved from http://java.sun.com/javase/technologies/desktop/javawebstart/download-spec.html on Apr. 9, 2010, pp. 1-85.

* cited by examiner

*Primary Examiner* — Insun Kang
*Assistant Examiner* — Erika Kretzmer
(74) *Attorney, Agent, or Firm* — Francis Lammes; Stephen J. Walder, Jr.; Jeffrey S. LaBaw (57) ABSTRACT

A method, system and program of executing an interpreted programming language application from a server at a designated virtual machine on a client computer are provided. A manifest file is extracted which indicates at least one resource for the interpreted programming language application as well as the repository file associated with the resource. The repository file is located in a web start cache and moved to a run directory accessible by the designated virtual machine, outside the web start cache. The interpreted programming language application is then executed from the run directory using the at least one resource.

16 Claims, 5 Drawing Sheets

INSTALLING AND UPDATING INTERPRETED PROGRAMMING LANGUAGE APPLICATIONS USING A DESIGNATED VIRTUAL MACHINE

This application is a continuation of application Ser. No. 11/333,451, filed Jan. 17, 2006, issued as U.S. Pat. No. 8,127,288 on Feb. 8, 2011.

BACKGROUND

The present invention relates to data processing systems and to the processes of installing, updating and running interpreted programming language applications on data processing systems. In particular, the present invention provides a method, program and system for installing and updating applications written in an interpreted programming language by using a web start application and while running in a designated virtual machine.

A virtual machine, such as the JAVA Virtual Machine (JVM) is a virtual computer component that resides in memory on a computer. For an application to be executed on different types of data processing systems, a compiler typically generates an architecture-neutral file format so that the compiled code is executable on any processor, so long as the JVM is accessible by the processor. The architecture-neutral file format consists of bytecode instructions that are generated by a JAVA compiler and are non-specific to a given computer architecture. A bytecode is a machine independent code generated by the JAVA compiler and executed by a JAVA interpreter. A JAVA interpreter, part of the JVM, alternately decodes and interprets an intermediary code called "bytecode". These bytecode instructions are designed to be easily interpreted on any platform and easily translated into native machine code.

Programs written in an interpreted programming language may be executed by such a programming virtual machine. Theoretically, any programming language may be interpreted; however the term "interpreted programming language" traditionally designates languages that are implemented through execution by an interpreter. The term "interpreted programming language" also designates languages for which no compilers are written.

In many interpreted languages, a basic interpreter translates basic code into native machine code. In an interpreted language such as JAVA, rather than generating native machine code, a compiler generates bytecodes to be used by the programming virtual machine. The JAVA virtual machine then translates the bytecodes into native machine code. JAVA, has an intermediate bytecode stage, because it is faster to translate bytecodes into native machine code than translating JAVA code, and bytecodes are machine/architecture independent, e.g. you can take bytecodes generated on one type of machine (UNIX) and bring them to totally different hardware, where the virtual machine will interpret them for use. These bytecodes provide the control and data necessary to execute an application. Subsequently, to actually execute an interpreted programming language application, an interpreter interprets the compiled bytecodes generated by the compiler.

JAVA is a well-known interpreted programming language and it is used herein as a preferred example. However, it should be well understood to those skilled in the art that other interpreted programming languages, such as RUM BASIC, SmallTalk, PYTHON, PERL and the like are within the scope of this invention.

JAVA is a software programming language, originally developed by Sun Microsystems, that is designed to generate applications that can run on all hardware platforms without modification. Because of this, JAVA applications have found extensive use on the World Wide Web (WWW). JAVA applications can be called from within hypertext markup language (HTML) documents or launched stand alone.

As is known to those skilled in the art, a WWW server may include facilities for storing and transmitting application programs, such as application programs written in JAVA, for execution on a client computer.

JAVA Web Start (JWS) provides a mechanism to run JAVA applications without installing anything on the client computer except a virtual machine and JWS. Generally, JWS simply downloads the JAVA application jar files from the server whenever the JAVA application is launched on the client computer. This takes advantage of the JAVA code's machine-independence to easily update the JAVA application when it is launched the next time on the client computer.

However, the virtual machine used by a web start application and subsequently by the main application is currently chosen in a manner that does not always optimize memory resources. Again, using the specific example of JAVA Web Start, JWS uses one JVM to run JAVA Web Start and the same JVM to run the main JAVA application, whether or not there are other JVMs available for use. This slows the running of both JWS and the main JAVA application on the one JVM. This is due to JAVA Web Start adding between 10-15 MB of memory overhead to every application started through Web Start because many swing classes and GUI classes that are in the jar file are loaded automatically by JWS onto the JVM, whether or not the classes are needed.

Additional overhead is added to the running of the main application because JWS does not guarantee the JVM version that the main application will run under. For example, if there are multiple JVMs installed on the same client computer, JWS can fork off any one of the JVMs depending on how they are registered in the system registry. This causes problems when the main application needs to be run inside a certain JVM—because of JVM version requirements, specific libraries installed to the particular JVM, etc. Moreover, as the various classes in the jar file are downloaded, JWS downloads them into its own web start cache location, obfuscating the filenames in the process so it is difficult to find the files that should be copied to a desired JVM. The term "web start cache" refers to a location on a client computer where the web start application stores copies of particular files in order to more easily access the files rather than having to request the files each time from the server. In some instances this cache may also be located at an intermediary location nearer to the client than to the server.

It would be desirable therefore to provide a mechanism to install and update applications written in interpreted programming languages so that they are installed using a designated virtual machine, particularly a local virtual machine which is not the same machine as that being used by the web start application.

It would be desirable to provide a mechanism to install and update applications written in interpreted programming languages so that only desired classes, of a desired virtual machine version, are loaded on the designated virtual machine.

The present invention provides a method and system for installing and updating applications written in interpreted programming languages from the server in order to overcome the objections described above.

SUMMARY

The method of the present invention executes an interpreted programming language application from a server at a designated virtual machine on a client computer. A manifest file is extracted which indicates at least one resource for the interpreted programming language application as well as the repository file associated with the resource. The repository file is located in a web start cache and moved to a run directory outside the web start cache. A web start application is launched and the manifest file is downloaded to the web start cache using the web start application. One or more repository files associated with the at least one resource are also downloaded to the web start cache using the web start application. The web start application is then terminated and the interpreted programming language application is then executed from the run directory rather than from the web start cache.

The method of the present invention further provides for associating cache version information with the repository file or files located in the web start cache. Meanwhile, directory version information is associated with the repository file or files located in the run directory. The cache version information is compared with the directory version information and the repository file or files are moved to the run directory if the cache version information is higher. A bootstrap class, that extracts the manifest file, is terminated on a web start virtual machine and the designated virtual machine is selected after its termination.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION

The present invention implements a data processing system and method for managing the installation of applications developed using an interpreted programming language, such as JAVA, REXX, BASIC, SmallTalk, PYTHON, PERL and the like. In such languages, instructions are compiled into bytecodes to be used by a virtual machine.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail.

Figure 1:
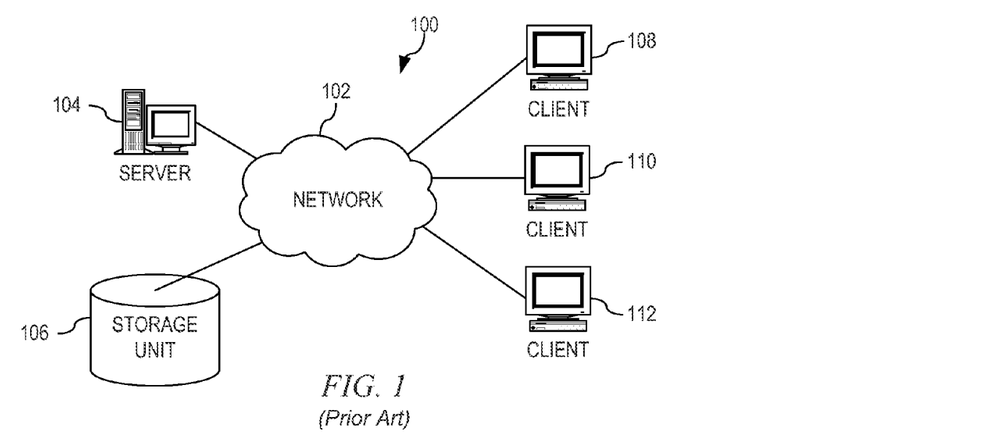
FIG. 1 is a block diagram of a network of data processing systems in which the present invention may be implemented.

FIG. 1 is a pictorial representation of one embodiment of distributed data processing system in which the present invention is implemented. Distributed data processing system 100 comprises a network 102, which is the medium used to provide communications links between various devices and computers connected together within distributed data processing system 100. Network 102 may include permanent connections, such as wire or fiber optic cables, or temporary connections made through telephone connections. The various processes that comprise the present invention may reside on the same host machine or on different machines interconnected over network 102. (e.g., the Internet, an intranet, a wide area network (WAN) or local area network (LAN)). Thus, machines benefiting from the present invention have appropriate networking hardware to establish a connection to one or more other machines (server and/or client computer). For example, machines connected to network 102 may have a TCP/IP or NETBIOS connection to a network running over a token ring or Ethernet adapter.

A server 104 is connected to network 102 as described above, along with storage unit 106. Server 104 provides data, such as core executables and supporting files to run interpreted programming language applications to client computers 108, 110, 112. Such data may be stored on storage unit 106 and accessed by server 104.

In an illustrative embodiment of the present invention, the central server 104 may utilize a Web-based software system, such as Sun Microsystems's JAVA Web Start that enables the central server 104 to distribute and update appropriate files needed for the execution of JAVA applications via a WWW connection.

Client computers 108, 110, and 112 are also connected to network 102. Client computers 108, 110, and 112 may be, for example, personal computers or network computers, having a variety of processors and operating systems.

Distributed data processing system 100 may include additional servers, clients, and other devices not shown. FIG. 1 is intended as an example, and not as an architectural limitation for the processes of the present invention.

Figure 2:
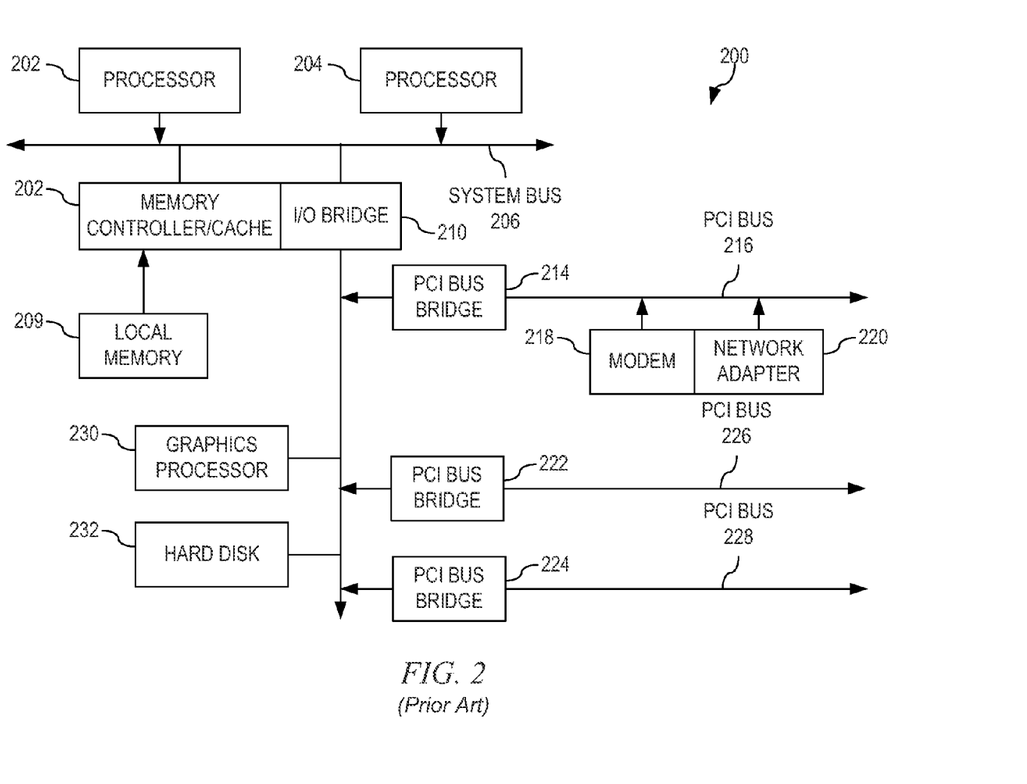
FIG. 2 is a block diagram of a data processing system that may be implemented as a server in accordance with a preferred embodiment of the present invention.

FIG. 2 is a block diagram of a data processing system that may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The data processing system depicted in FIG. 2 may be, for example, an IBM eServer pSeries, a product of International Business Machines Corporation in Armonk, N.Y., running the Advanced Interactive Executive (AIX) operating system. FIG. 2 is not meant to imply architectural limitations with respect to the present invention.

In one embodiment of the invention, files required to run an application written in an interpreted programming language are packaged in at least one repository file. One or more repository files may be available for any given application. This repository file is any suitable bundled group of files all related to each other such as, for example, executable files and their requisite components. In some instances, a repository file simply includes a single file. In an illustrative embodiment of the invention, the repository file is a jar file called, for example "install.jar" on server 104. Another file indicating the version number of the files bundled in the repository file is also packaged within the repository file on server 104. Another file indicating the designated virtual machine to use for installing the files is also packaged within the repository file on server 104. Therefore, in accordance with the present invention, the repository file contains the following:

Some or all of the files necessary to run the interpreted programming language application; and a manifest file which has the name of one specific resource from each file above as well as the corresponding name of the repository file where the resource belongs; and a file designating version information of one or more of the files in the repository file.

Figure 3:
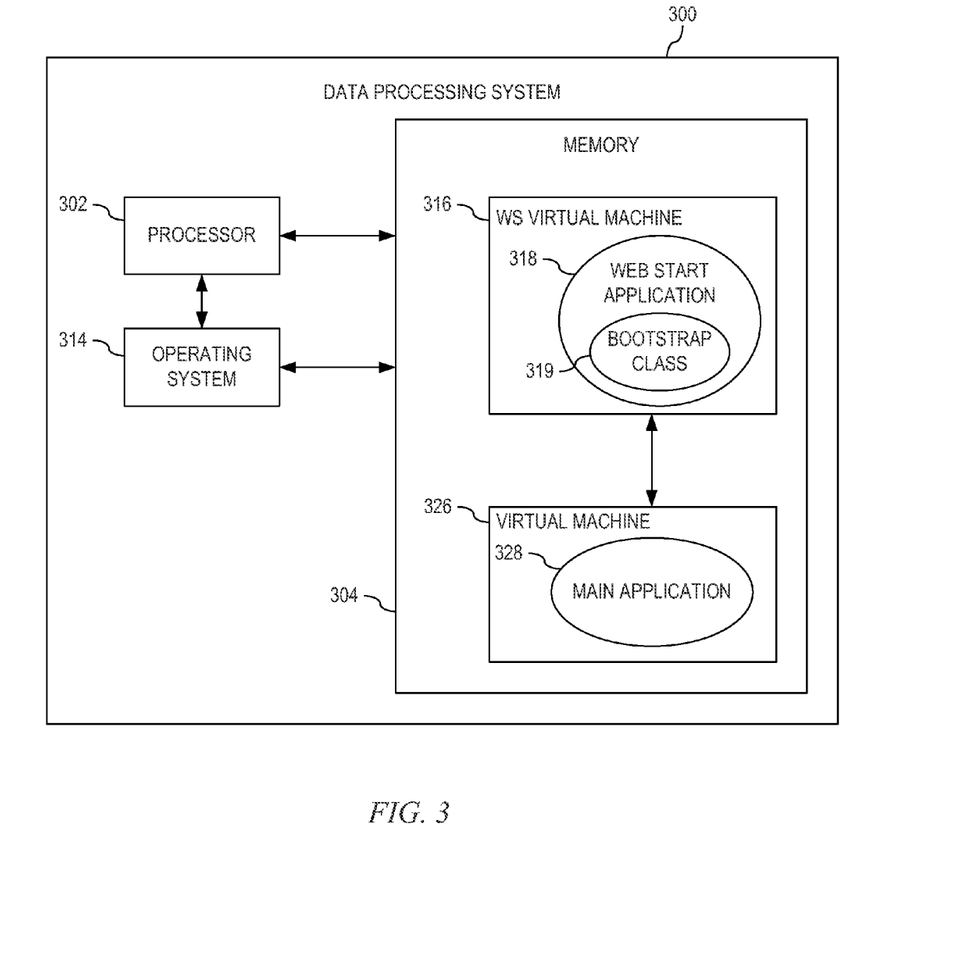
FIG. 3 is a block diagram illustrating a data processing system in which the present invention may be implemented.

FIG. 3 is a block diagram of a data processing system that may be implemented as a client computer, such as computers 108, 110, 112. One or more of the processes that install or update interpretive programming language applications may be carried out on such a client computer, or on one or more such computers connected via a computer network. In an illustrative embodiment, the installation or updating of JAVA applications are carried out on such a client computer, or on one or more computers connected via a computer network.

In addition to other components, the data processing system 300 of FIG. 3 comprises processor 302, main memory 304, operating system 314, and at least two virtual machine interpreters 316, 326. One VM 316 is used to run a web start application 318 having a bootstrap class 319. Another VM 326 is used to run one or more main application program 328.

Operating system 314 runs on processor 302 and is used to coordinate and provide control of various components within data processing system 300 in FIG. 3. The operating system may be a commercially available operating system, such as Windows XP, which is available from Microsoft Corporation. One or more programming systems may run in conjunction with the operation system 314, such as interpreted programming languages including but not limited to JAVA, REXX, BASIC, SmallTalk, PYTHON, PERL and the like. An object-oriented programming system such as JAVA may run in conjunction with the operating system and provide calls to the operating system from JAVA programs or applications executing on data processing system 300, ("JAVA" is a trademark of Sun Microsystems, Inc.). Means for the operating system, the object-oriented programming system, and applications or programs are located on storage devices, such as hard disk drives and may be loaded into main memory 304 for execution by processor 302.

Web Start Virtual Machine 316 is an abstract computing machine that includes an instruction set and uses various memory areas within memory 304. In accordance with one aspect of the present invention, Virtual Machine (VM) 316 is used to run Web Start application (WSA) 318. VM 316 is loaded or stored, for example, in main memory 304 for execution by processor 302. VM 316 is any suitable virtual machine capable of interpreting one or more interpreted programming languages in order to provide data or control of a desired program to operating system 314. In an illustrative embodiment, Sun Microsystems JAVA 2 Platform, Standard Edition (J2SE) emulates the VM on various platforms. Further details about the JAVA Virtual Machine in particular may be obtained in The Java™ Virtual Machine Specification, Tim Lindholm and Frank Yellin, Addison Wesley (1997), ISBN 0-201-63452-X, which is incorporated herein by reference. Any suitable JAVA virtual machine interpreter may also be used.

Figure 4A:
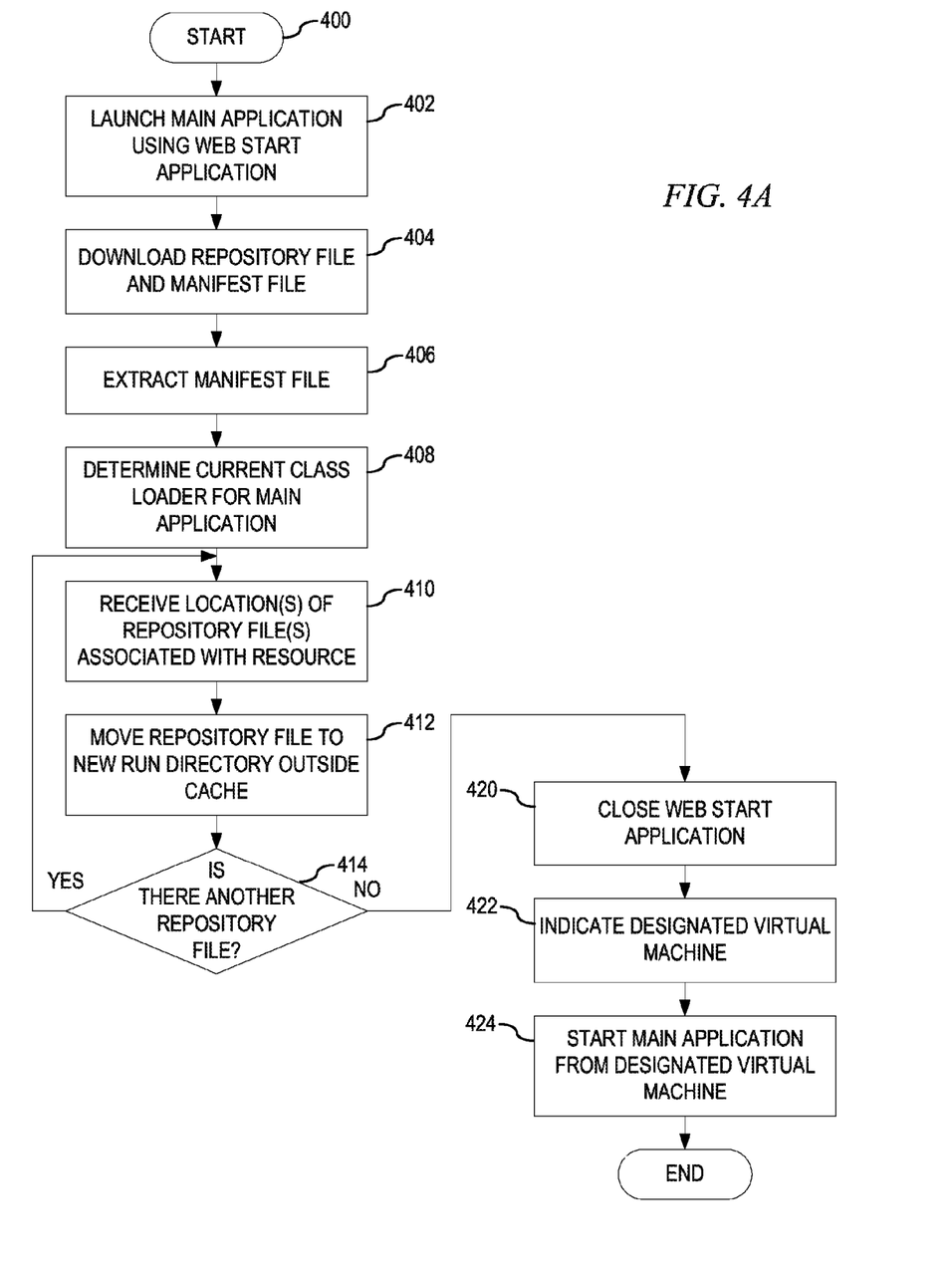
FIG. 4A illustrates a method of dynamically installing and updating applications written in interpreted programming languages using a designated virtual machine, in accordance with one embodiment of the current invention.
Figure 4B:
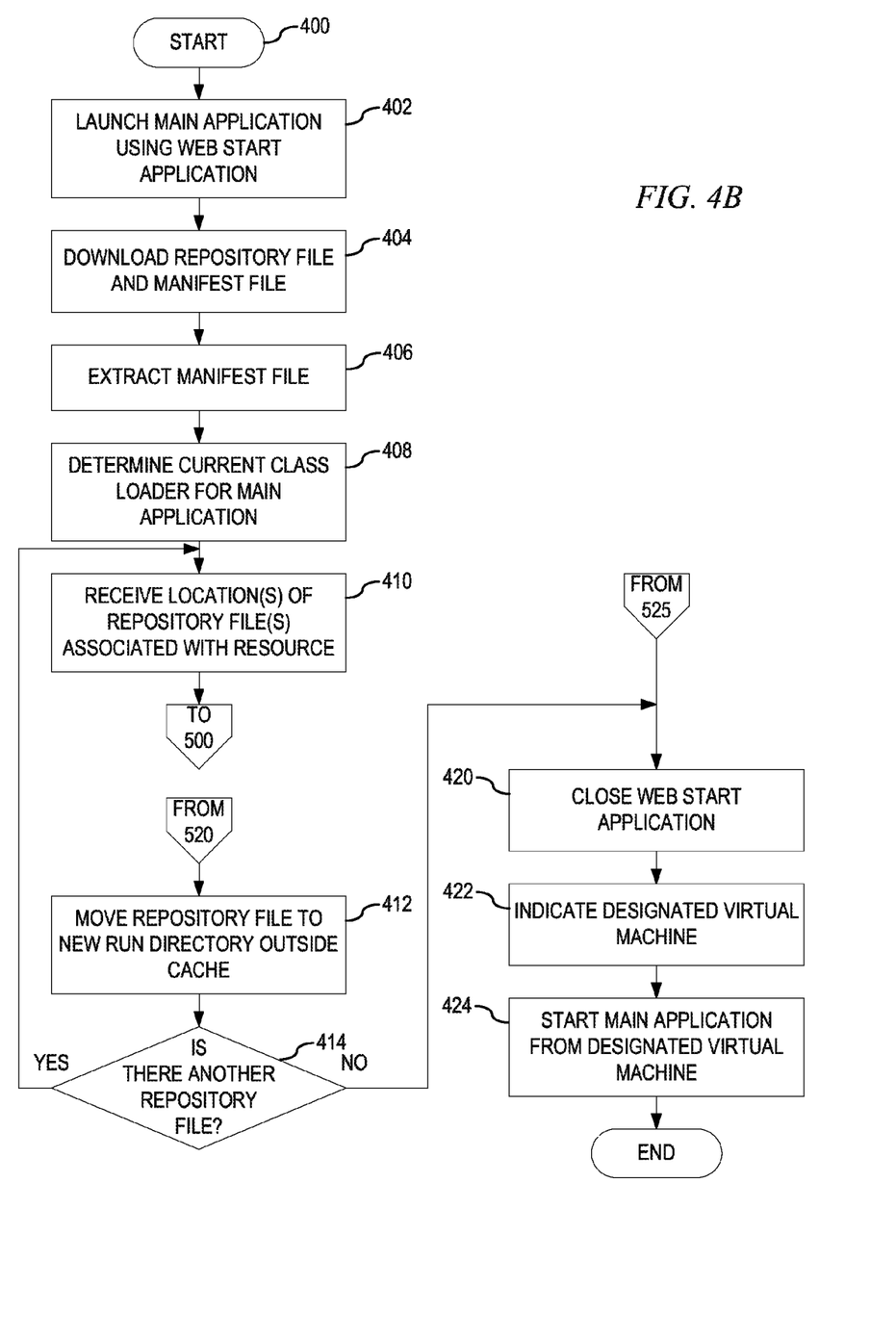
FIG. 4B illustrates an alternative method of dynamically installing and updating applications written in interpreted programming languages using a designated virtual machine, in accordance with one embodiment of the current invention.

Web Start application (WSA) 318 is a Web-based software system that enables a server 104 to distribute and update desired interpreted programming language applications via a WWW connection with client computers 108, 110, 112 as described further in FIGS. 4A and 4B. WSA 318 is loaded or stored, for example, in main memory 304 for execution by processor 302. WSA 318 is used to launch interpreted programming language applications on client computers 108, 110, 112 in a dedicated platform or runtime environment, which contains core executables, core files, supporting files and any other data needed to launch the desired application. WSA 318 preferably includes a bootstrap class 319. The functions of bootstrap class 319 include, but are not limited to, determining class loaders for running applications, getting system resource information for application resources, determining the versions of the latest repository files copied and directing the copying of specific files within the main repository file.

In an illustrative embodiment, WSA 318 is JAVA Web Start, which is a Web-based software system that enables a server 104 to launch desired JAVA applications on one or more client computers and to provide other required data for execution of JAVA applications to client computers via a WWW connection. For example, WSA 318 installs or updates application files for programs in interpretive programming languages to be run on VM 316, 326. In an illustrative embodiment of the invention, WSA 318 installs or updates JAR files. In accordance with the present invention, WSA 318 is a part of, or in communication with, VM 316.

Thus, in this illustrative example, the JAVA Runtime Environment (JRE) includes the JAVA Web Start application, JAVA Virtual Machine, core executables, core files and support files to create a standard JAVA platform. The JRE is therefore generally already present on client computer 108, 110, 112 by the time JAVA Web Start is run. For example, when a user first accesses a JAVA application, the JWS software will download all the needed files for the application, as well as download the JRE if the requested version is not available locally.

Virtual Machine 326 is also an abstract computing machine that includes an instruction set and uses various memory areas within memory 304. In accordance with one aspect of the present invention, Virtual Machine 326 is designated to run main application 328. VM 326 may be a VM 326 like VM 316 in every detail but, in accordance with the present invention, differing in the programs being executed. VM 326 is loaded or stored, for example, in main memory 304 for execution by processor 302. VM 326 is any suitable virtual machine capable of interpreting one or more interpreted programming languages to provide data or control of a desired program to operating system 314.

Main application 328 is a Web-based software system that enables a server 104 to execute desired application functions and process data related to these application functions on a client computer 108, 110, 112 via a WWW connection. Typically, main application 328 is launched in a dedicated platform or runtime environment, which can access executables, supporting files and any other data needed to run the desired application. Although FIG. 3 shows only one main application, the method of the present invention is suitable for use with a plurality of desired applications. In accordance with the present invention, main application 328 is designated to be a part of or in communication with VM 326 and may be launched by WSA 318. In an illustrative embodiment, main application 328 is any desired JAVA application, many of which are well known in the art.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may also be used in addition to, or in place of, the hardware depicted in FIG. 3. Also, the processes of the present invention may be applied to a multiprocessor data processing system.

Thus, for example, client computer 108, 110, 112 is any personal computer or workstation platform that is Intel-, PowerPC- or RISC-based, and that includes an operating system such as IBM OS/2, Microsoft Windows XP, Microsoft Windows NT 4.0, Unix, AIX 5SL or the like. A representative computer runs an Intel x86 processor, the OS/2 Warp Version 3 operating system, JVM Version 1.1.1 and JAVA Web Start 1.04. Alternatively, the computer runs an x86 processor, the Windows XP (or Windows NT) operating system, JVM version is 1.4 and above. Generally the JWS version is also 1.4 and above, based on the version of the JVM it is packaged with.

FIG. 3 is not meant to imply architectural limitations. For example, data processing system 300 also may be a notebook computer, hand held computer or Personal Digital Assistant. Data processing system 300 also may be a kiosk or a Web appliance.

FIG. 4A is a flow diagram of one method 400 of installing and updating an interpreted programming language application, in accordance with the present invention. The method of the present invention can be accomplished by a computer program product accessible from a computer-usable or computer-readable medium providing program code for use by or in connection with a computer or any instruction execution system, such as, for example, JAVA Web Start.

In one embodiment of the invention, the method is accomplished by launching a computer program, for example, before block 402. This master program or in terms of JAVA, a master class, or object, would start up, for example, as the web start application is launched. This program could also be run, for example, by being launched by a user who selects the option of running the computer program from a graphic user interface in a manner well known in the art. The program could also be launched by a start command typed in, for example, by a user on a command line. In one embodiment of the invention, the master program simply launches a web start application (and appropriate bootstrap) and designates a particular virtual machine for use by the main application; meanwhile the bootstrap class accomplishes the rest of the method. In another embodiment of the invention, the master program controls the entire method.

As seen at block 402, method 400 begins when web start application 318 attempts to launch an interpreted programming language application on client computer 108, 110, 112. Generally, the launch of the main application involves the client computer 108, 110, 112 connecting to the server 104. At this time, in accordance with the present invention, a bootstrap program or class for the web start application may be launched. The bootstrap runs within the web start application environment. In one embodiment of the invention, the bootstrap class accomplishes the rest of the method from hereon. This is accomplished for example over a typical network connection as described above. In an illustrative embodiment, JAVA Web Start attempts to launch a main JAVA application by connecting to server 104 from a client computer.

As seen at block 404, the method then proceeds to download at least one repository file from the server 104 as well as a manifest file. The manifest file may be packaged together or separately with the repository file. The repository file includes all the latest server versions of files necessary to run the interpreted programming language application. In an illustrative embodiment, bootstrap class 319 is a JAVA bootstrap and executes the downloading of a JAR file or files as well as the manifest file.

The files necessary for running the interpreted programming language application are re-named as they are downloaded from the server into the web start application's own unpublished cache. It is not clear from these re-namings what the files were originally named, what function they might have (i.e., whether they are necessary to run the main application) or what version they are (i.e., whether they are the latest version).

As seen at block 406, the manifest file is extracted. It may be extracted, for example, by bootstrap class 319. The manifest file has the name of at least one specific resource from each repository file for the main application. With that resource, the manifest file also indicates the name of the repository file to which the resource belongs.

In an illustrative example, the following three lines are in the manifest file:

Com.remoteaccess.OSInfo.class=RXA.jar
license.html=license.jar
manifest.txt=manifest.jar Thus, the JAR (repository) file called "manifest.jar" includes a resource called "manifest.txt" and the JAR (repository) file called "license.jar" includes a resource called "license.html".

As seen at block 408, the current class loader for the main application is determined. This provides an instance in which a class required for the main application is named. In an illustrative example, bootstrap 319 is a JAVA bootstrap and calls the getClassLoader( ) method from within JWS in a manner known to those skilled in the art. This indicates at least one object class that is used by the bootstrap of the web start application. By getting an instance of the bootstrap's class loader, an object is provided for the method to extrapolate the resources in the manifest file in subsequent steps.

As seen at block 410, the client computer 108, 110, 112 determines the location of each resource in the manifest file on its own system, using the object determined at 408. These resources are being used by WSA 318 working within VM 316. These resources are located somewhere within the web start cache of WSA 318. The web start cache of WSA 318 is a location wherein particular files are stored (cached) so that the files are more easily accessible to the client computer 108, 110, 112. In one embodiment of the invention, the web start cache is a memory location on the actual client computer 108, 110, 112. The method reviews each line in the manifest file and uses a command to locate each file indicated in each line. In an illustrative embodiment, bootstrap 319 calls the ClassLoader.getSystemResource method from within JWS to obtain each resource in a manner known to those skilled in the art. This returns the filename of the repository file in the web start cache that VM 316 is retrieving the resource from. That is, the Get System Resource command returns a pointer that indicates the repository file in the web start cache where resources for the VM 316 are located.

In the illustrative example of the JAR (repository) files listed above, bootstrap 319 calls the ClassLoader.getSystemResource method and the name "license.jar" is returned because VM 316 is retrieving the resource "license.html". In another instance "RXA.jar" is returned because VM 316 is retrieving the resource "Com.remoteaccess.OSInfo.class."

As seen at block 412, the information retrieved at block 410 is used to find each required repository file and copy it to a new location outside the web start cache. In an illustrative example, this new location is a new run directory outside the web start cache. This new run directory is accessible from a virtual machine 326 which will run the main application. The repository files may be moved using any suitable method known in the art. For example, the repository files may be moved out of the web start cache. The repository files may be moved, for example, by bootstrap class 319 or by any suitable component of the web start application 318. In a JAVA embodiment of the invention, the command "open stream" may be used. In such an instance, the resources are received as a data stream. As bytes are read from a given resource, they are moved to a new location.

As seen at block 414, the method determines whether another repository file is providing resources from the web start cache. If there is another repository file from which the virtual machine 316 is obtaining resources, the method returns to block 410 and continues to retrieve required repository files and move them to a location outside the web start cache. In an illustrative embodiment, bootstrap 319 is a JAVA bootstrap class and uses the script file to pinpoint and move required JAR files to a location outside the web start cache.

Once it is determined that no more repository files are providing resources to the virtual machine 316, the method proceeds to block 420, where web start application 318 is terminated. In one embodiment of the invention, this step involves terminating the bootstrap class. In accordance with the present invention, WSA 318 thereby downloads the main application, installs it to a run directory, updates it if necessary, but then is able to terminate its control of the main application, thereby reducing the memory overhead.

As seen at block 422, an appropriate virtual machine, for example VM 326, is designated to run the main application. This virtual machine is determined, for example, based on the run directory, to which all the resources of the main application have been moved. In an illustrative embodiment, VM 326 is a JAVA Virtual Machine used for running applications rather than the JWS virtual machine which is typically used by JAVA Web Start. In one embodiment of the invention, the master program described above designates the appropriate virtual machine for use after terminating the bootstrap class which accomplished the rest of the method.

As seen at block 424, the main application is then fully launched from within the designated virtual machine, where it may run its task without interruption and without the memory overhead of the web start application. In an illustrative embodiment, a JAVA application is launched. This main JAVA application could perform any suitable JAVA function, several of which are known in the art, drawing on the resources that have been moved to the new run directory at block 412.

Figure 5:
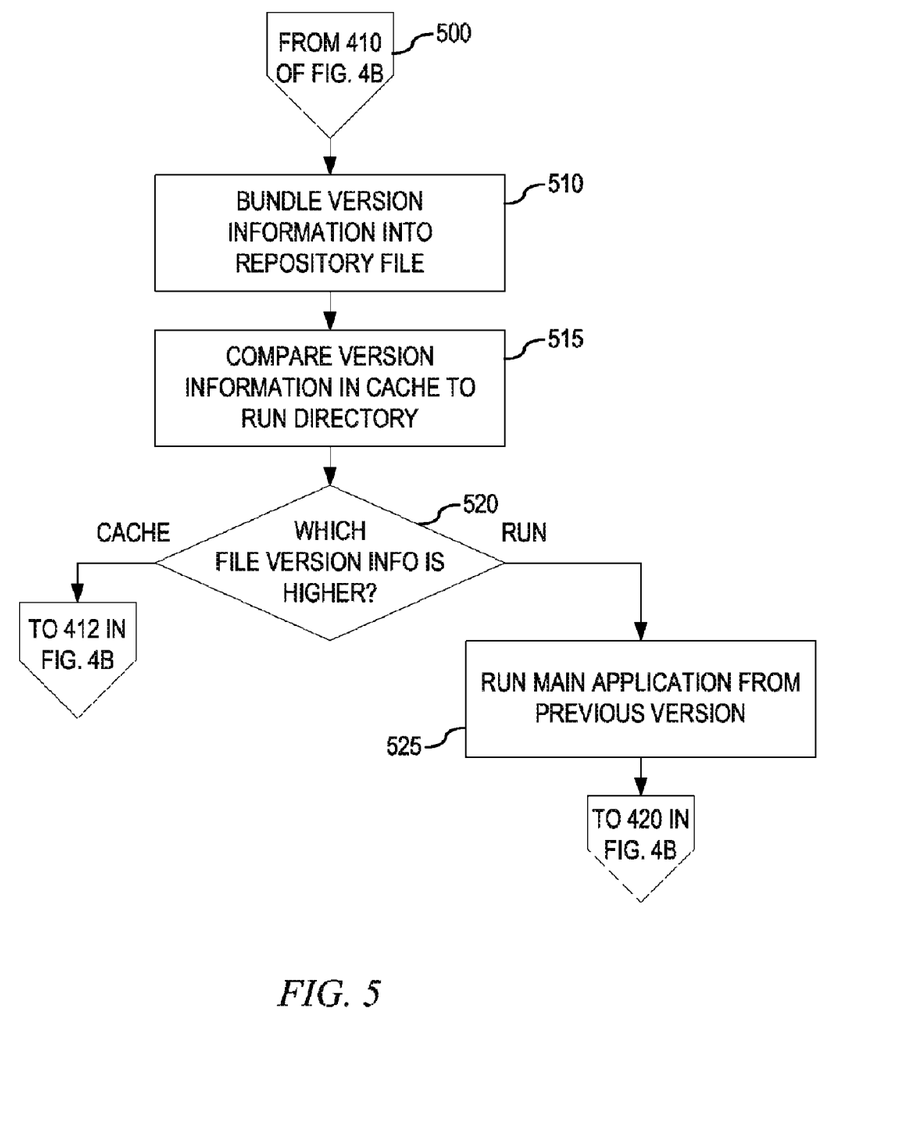
FIG. 5 illustrates a subroutine of a method of dynamically installing and updating applications written in interpreted programming languages using a designated virtual machine, in accordance with one embodiment of the current invention.

FIG. 4B is a flow diagram of alternate method 400 of installing and updating an interpreted programming language application, in accordance with the present invention. As seen in FIG. 4B, there is an additional subroutine 500 that may be implemented in accordance with the present invention. Thus, method 400 implements subroutine 500 before moving to block 412. This subroutine 500 is discussed in FIG. 5. FIG. 5 is a flow diagram of one subroutine 500 of a method of installing and updating an interpreted programming language application, in accordance with the present invention. The subroutine of the present invention can be accomplished by a computer program product accessible from a computer-usable or computer-readable medium providing program code for use by or in connection with a computer or any instruction execution system, such as, for example, JAVA Web Start.

Subroutine 500 may be invoked at any suitable moment, such as, for example, after the client computer has determined the location of a resource within web start cache of WSA 318. This resource will have a repository file associated with it as detailed in the manifest file. Having determined the repository file associated with this resource, version information may be bundled with this repository file as seen at block 510. For example, this version information could be stored in a flat text file which is included in the actual downloaded repository file. Alternatively, the manifest file could be given a version field and the version information stored in this field would indicate the version of all the filenames listed in the manifest file. Versioning could be done for every repository file, i.e., version information could be stored for every repository file used by a given application. Alternatively, one version tag could be stored for the entire set of repository files, used by the given application. Although this version information is shown bundled into the repository files at the client computer during the method of the present invention, it is contemplated that the version information could also be bundled into one or more repository files at the server.

The version information could be indicated using a single numerical string, indicating the version of the file(s) associated with the string. The string is incremented every time an associated file is modified. Thus the version string originally contains, for example, number 1.1. After the modification of an associated file, the string would then contain number 1.2. The version string is incremented with any change to the associated files and, as indicated above, may be incremented on the server with changes to the original repository files, or on the client computer (for example at block 410) when the repository files are being located in the web start cache or (for example at block 510) when the repository files are being moved to a new run directory. In one embodiment of the invention, the version information is copied to the new run directory when the repositories are moved.

As seen at block 515, the method then proceeds to compare the version information of the repository files in the web start cache with the version information of the repository files in the new run directory. For example, when WSA 318 runs the bootstrap class 319, it will check if the version information downloaded to the cache is newer than the information already in the run directory for the designated virtual machine 326.

As seen at block 520, this version number comparison involves determining whether the file version is higher in the web start cache or in the new run directory. In one embodiment of the invention, this comparison is a string comparison of the two numbers in one or more version fields. Thus, if the version information is stored for every repository file, the version string in a first repository file in the web start cache is compared to the version string of the same repository file in the run directory while the version string in a second repository file in the web start cache is compared to the version string of the same second repository file in the run directory. If one version tag is stored for the whole set of repositories, only one version string comparison is made.

If the version information in the web start cache is higher, then the method returns to block 412 of FIG. 4B and moves one or more of the repository files in the web start cache to the new run directory. If version information is stored file by file, then the repository files that are copied are only those repository files which are newer versions than the ones in the new run directory. If version information is tagged for the whole set of repositories, then if one repository version has been changed, all the repositories are copied to the new run directory. In one embodiment of the invention, this is accomplished by a JAVA bootstrap 319 within JWS 318 in order to move the latest versions of JAR (repository) files to a run directory that may be accessed in order to run a JAVA application within JVM 326 rather than JWS's JVM 316.

As seen at block 525, if the version information in the new run directory is higher than that in the web start cache, the main application may be run from the previous versions of file resources that are already in the new run directory. As illustrated in FIG. 5, the method would proceed to block 525 and run the main application from within VM 326 rather than WSA's VM 316 as is shown by the operation retuning to step 420 of FIG. 4B. It is contemplated, therefore, that. WSA 318 would terminate and main application would run its task without interruption and without the memory overhead of the web start application, drawing on resources that were previously moved to the new run directory, for example at block 412.

In the above embodiment, the step of block 525 is particularly useful, for example, if the entire main application comes in a single repository file. It may then be assumed that all the files in the single repository file would all be compatible and that the best solution would be to get the most recent version of the application files.

In other embodiments of the invention, compatibility of the files may also be determined as the version information is checked at block 525. This may be used, for example, in cases where files in the run directory are acquired from different areas, such as from several different repository files or from a repository file downloaded from the server as well as local files from the local computer. Compatibility information could also be stored in a numeric or alphanumeric string, associated with the version information string described above.

In other embodiments of the invention, compatibility of the files to a given JRE could also be determined while the version information is checked at block 525. Another possibility would be a check of the JRE and whether it was compatible with the JAR file. You might give the user a decision to retrieve a newer/older version of the JAR file to be compatible with the JRE or to retrieve a new version of the JRE. Since the application is probably smaller than the JRE to download, some users might prefer the quicker download so long as the needed functions were there. Of course, you might have an administrator override if either the jar file or the JRE were found to present a security risk.)

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include computer readable storage media such as a semiconductor or solid state memory, magnetic tape, a removable computer diskette, a random access memory (RAM), a read-only memory (ROM), a rigid magnetic disk and an optical disk.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of executing an interpreted programming language application (IPLA) from a server at a designated virtual machine on a computer, comprising:

extracting, by a web start virtual machine executed by a processor on the computer, a manifest file, wherein the manifest file indicates at least one resource for the IPLA and a repository file and wherein the repository file is associated with the at least one resource;

locating, by the web start virtual machine, the repository file in a web start cache in a web start application of the web start virtual machine;

moving, by the web start virtual machine, the repository file to a run directory accessible by the designated virtual machine, wherein the run directory is outside the web start cache;

terminating, by the processor, the web start virtual machine;

designating, by the web start virtual machine, a particular virtual machine from a plurality of virtual machines for use by the IPLA based upon the run directory to which the repository file was moved thereby forming the designated virtual machine, wherein the designated virtual machine runs a different set of classes in executing the IPLA as compared to the web start virtual machine executing the IPLA via the web start application; and executing, by the designated virtual machine executed by the processor on the computer, the IPLA from the run directory rather than the web start cache using the at least one resource.

2. The method of claim 1, further comprising:

launching, by the processor, the web start application with the web start virtual machine; and downloading, by the web start virtual machine, the manifest file to the web start cache using the web start application.

3. The method of claim 2, further comprising:
downloading, by the web start virtual machine, the repository file associated with the at least one resource to the web start cache using the web start application.

4. The method of claim 2, further comprising:
executing, by the processor, the IPLA from the designated virtual machine rather than the web start virtual machine.

5. The method of claim 1, further comprising:
associating, by the web start virtual machine, cache version information with the repository file in the web start cache; and
associating, by the web start virtual machine, directory version information with the repository file in the run directory.

6. The method of claim 1, further comprising:
terminating, by the processor, a bootstrap class on a web start virtual machine, wherein the bootstrap class extracts the manifest file; and
selecting, by the processor, the designated virtual machine for use after terminating the bootstrap class.

7. A system of executing an interpreted programming language application (IPLA) from a server at a designated virtual machine on a client computer, comprising:
a processor; and
a memory coupled to the processor, wherein the memory comprises instructions which, when executed by the processor, cause the processor to:
extract, by a web start virtual machine on the client computer, a manifest file, wherein the manifest file indicates at least one resource for the IPLA and a repository file and wherein the repository file is associated with the at least one resource;
locate, by the web start virtual machine, the repository file in a web start cache in a web start application of the web start virtual machine;
move, by the web start virtual machine, the repository file to a run directory accessible by the designated virtual machine, wherein the run directory is outside the web start cache;
terminate the web start virtual machine;
designate, by the web start virtual machine, a particular virtual machine from a plurality of virtual machines for use by the IPLA based upon the run directory to which the repository file was moved thereby forming the designated virtual machine, wherein the designated virtual machine runs a different set of classes in executing the IPLA as compared to the web start virtual machine executing the IPLA via the web start application; and
execute, by the designated virtual machine on the client computer, the IPLA from the run directory using the at least one resource.

8. The system of claim 7, wherein the instructions further cause the processor to:
launch the web start application with the web start virtual machine; and
download, by the web start virtual machine, the manifest file to the web start cache using the web start application.

9. The system of claim 8, wherein the instructions further cause the processor to:
download, by the web start virtual machine, the repository file associated with the at least one resource to the web start cache using the web start application.

10. The system of claim 7, wherein the instructions further cause the processor to:
associate, by the web start virtual machine, cache version information with the repository file in the web start cache; and
associate, by the web start virtual machine, directory version information with the repository file in the run directory.

11. The system of claim 7, wherein the instructions further cause the processor to:
terminate a bootstrap class on a web start virtual machine, wherein the bootstrap class extracts the manifest file; and
select the designated virtual machine for use after terminating the bootstrap class.

12. A computer program product comprising a computer readable storage medium having a computer readable program stored therein for executing an interpreted programming language application (IPLA) from a server at a designated virtual machine on a client computer, wherein the computer readable program, when executed on a computing device, causes the computing device to:
extract, by a web start virtual machine on the computing device, a manifest file, wherein the manifest file indicates at least one resource for the IPLA and a repository file and wherein the repository file is associated with the at least one resource;
locate, by the web start virtual machine, the repository file in a web start cache in a web start application of the web start virtual machine;
move, by the web start virtual machine, the repository file to a run directory accessible by the designated virtual machine, wherein the run directory is outside the web start cache;
terminate the web start virtual machine;
designate, by the web start virtual machine, a particular virtual machine from a plurality of virtual machines for use by the IPLA based upon the run directory to which the repository file was moved thereby forming the designated virtual machine, wherein the designated virtual machine runs a different set of classes in executing the IPLA as compared to the web start virtual machine executing the IPLA via the web start application; and
execute, by the designated virtual machine on the computing device, the IPLA from the run directory using the at least one resource.

13. The program of claim 12, wherein the computer readable program further causes the computing device to:
launch the web start application with the web start virtual machine; and
download, by the web start virtual machine, the manifest file to the web start cache using the web start application.

14. The program of claim 13, wherein the computer readable program further causes the computing device to:
download, by the web start virtual machine, the repository file associated with the at least one resource to the web start cache using the web start application.

15. The program of claim 12, wherein the computer readable program further causes the computing device to:
associate, by the web start virtual machine, cache version information with the repository file in the web start cache; and
associate, by the web start virtual machine, directory version information with the repository file in the run directory.

16. The program of claim 12, wherein the computer readable program further causes the computing device to:
  terminate a bootstrap class on a web start virtual machine, wherein the bootstrap class extracts the manifest file; and
  select the designated virtual machine for use after terminating the bootstrap class.

* * * * *